US006089248A

United States Patent [19]

Rost

[11] Patent Number: 6,089,248

[45] Date of Patent: Jul. 18, 2000

[54] LOAD SENSE PRESSURE CONTROLLER

[75] Inventor: Alvin S. Rost, Fridley, Minn.

[73] Assignee: Dana Corporation, Toledo, Ohio

[21] Appl. No.: 09/212,246

[22] Filed: Dec. 16, 1998

[51] Int. Cl.[7] ...................... G05D 7/00

[52] U.S. Cl. .................. 137/115.06; 60/452; 137/596.13

[58] Field of Search .................... 60/452; 137/504, 137/596.13, 115.06

[56] References Cited

U.S. PATENT DOCUMENTS

| | | | |
|---|---|---|---|
| Re. 30,828 | 12/1981 | Budzich | 137/596.13 |
| 3,841,096 | 10/1974 | Koppen et al. | 137/596.13 X |
| 4,020,867 | 5/1977 | Sumiyoshi | 137/596.13 |
| 4,072,443 | 2/1978 | Heath . | |
| 4,132,506 | 1/1979 | Dantlgraber . | |
| 4,344,285 | 8/1982 | Ridge . | |
| 5,305,789 | 4/1994 | Rivolier . | |
| 5,337,778 | 8/1994 | Thomsen et al. . | |
| 5,454,223 | 10/1995 | Tschida et al. . | |
| 5,878,766 | 3/1999 | Dekhtyar | 137/501 X |

*Primary Examiner*—Gerald A. Michalsky

*Attorney, Agent, or Firm*—Millen, White, Zelano & Branigan

[57] ABSTRACT

A load sense pressure controller used with a hydraulic control valve such as a hydraulic direction control valve includes a body in the form of a barrel having a threaded first end and a threaded second end. An externally threaded first plug is threaded into the first end of the body and an externally threaded second plug is threaded into the second end of the body. Both first and second plugs each have passages therethrough wherein the passage through the first plug is connected to the load sense passage from a valve and the passage through the second plug is connected to a tank passage in the control valve. Disposed between the first and second plugs is a piston which is biased by a coil spring toward the first plug. The piston has a stepped axially extending passage extending therethrough which is intersected by a radially extending passage. The radially extending passage normally aligns with lateral openings in the body so that when there is a load sense condition, hydraulic fluid flows through lateral openings in the body to the return passage. If the load sense pressure exceeds a selected high pressure, then all of the load sense fluid is throttled through the pressure controlling orifice in the piston to the tank passage of the control valve.

11 Claims, 6 Drawing Sheets

LOAD SENSE PRESSURE CONTROLLER

FIELD OF THE INVENTION

The present invention relates to a load sense pressure controller, and more particularly, the present invention relates to load sense pressure controller, bleed-off systems.

BACKGROUND OF THE INVENTION

Devices such as power shovels, loaders, bulldozers, hydraulic lifts, and the like rely on hydraulic cylinders and motors in order to perform their various functions. The hydraulic cylinders or motors are powered by a hydraulic pump, such as a swash plate pump, which is connected through a fluid control valve generally operated directly or indirectly by manually manipulated handles, cables or the like which control flow of hydraulic fluid to the hydraulic cylinders or motors.

The directional control valves generally include a body having a pressure port which is connected to the pump; tank ports which are connected to a tank or reservoir for hydraulic fluid, and work ports connected to one or more hydraulic cylinders. The operating devices selectively connect various ports with one another in order to control operation of hydraulic cylinders so that fluid is delivered to the cylinders and exhausted from the cylinders in accordance with the operator's purposes. Fluid control valves under consideration with respect to this invention include a body having a bore formed therein which receives a spool with a plurality of circumferential grooves thereon. The various ports are in communication with the bore via passageways which are selectively connected by positioning the spool axially with the bore.

Generally, directional control valves are classified as open center systems, closed center systems, and load sensing systems. Open center systems are relatively inexpensive, uncomplicated, and imprecise, whereas closed center systems are responsive and precisely controllable but relatively expensive. Both open and closed center systems tend to be inefficient. Load sensing systems, which are the subject of this invention, tend to be relatively efficient because the pump which generates the flow of fluid to the fluid control valve delivers that fluid at a variable flow rate and at a variable output pressure based upon the instantaneous requirements of the device controlled by hydraulic cylinders connected to the directional control valve. This is accomplished by providing a feedback signal to the pump which is representative of the fluid pressure required to operate the control device and controlling the output pressure from the pump to assume a predetermined magnitude greater than the feedback signal. In that the predetermined pressure differential between the operating pressure and required pressure is relatively small, the efficiency of a load sensing hydraulic system is much higher than the efficiency of open center and closed center systems. Directional control valves having a compensating structure for controlling the pressure differential thereacross, and consequently the flow of fluid thereto, are generally referred to as load sensing or pressure compensating valves.

The load sensing or pressure compensating valve may be either a pre-pressure compensated valve or a post-pressure compensation valve. In post-pressure compensated valves, the compensator is positioned between the spool and the output work port of the fluid control valve to regulate the pressure of the fluid supplied from the spool to a predetermined magnitude less than the pressure of the fluid at the inlet pressure port but greater than the pressure of the fluid in the active work port. Accordingly, a constant pressure differential is maintained across the spool, resulting in a constant flow of fluid therethrough, regardless of changing load requirements. A number of post-pressure compensator structures are known in the art; however, these known arrangements are rather complicated and/or require a number of components, and therefore are relatively expensive or difficult to service. Moreover, employment of post-pressure compensators can be further improved by having the components function so that maximum system operating pressure is adjusted, whereby maximum pump output flow is achieved at maximum system operating pressure.

SUMMARY OF THE INVENTION

It is a feature of the present invention to provide a flow limiter between a load sense line from a control valve and a load sense passage so as to limit flow to tank at elevated load sense pressures when the control valve is in its powered position in order to minimize high parasitic flow loss from available flow produced by a pump.

In view of the foregoing features, the present invention is directed to a flow limiter useful in a controlled flow of hydraulic fluid from a pump wherein the directional control valve includes a valve body with a load sense port, an inlet port, a return connected to tank and a load sense passage. The flow limiter is in communication with the load sense passage and the return. The valve normally connects the load sense passage to a compensator for the pump and includes a pressure controlling orifice communicating with the return. A pressure responsive bias urges the valve to connect the load sense passage to return passage of the valve with a selected force, the valve having a reaction surface for overcoming the bias when the pressure in the load sense passage of the valve exceeds the selected force of the bias. When the pressure exceeds the force of the bias, communication between the load sense passage and tank passage causes at least a substantial portion of the fluid from the load sense passage of the valve to be throttled through the pressure controlling orifice to the return.

In still further aspects of the invention, the element is a piston slidable within the barrel, the reaction surface being on the piston and the bias being a spring urging the piston to the first position.

In a further aspect of the invention, the piston has an axially extended stepped bore and a radial bore, wherein the axially stepped bore includes the pressure controlling orifice and is in communication with the return while the radial bore is in communication with the load sense passage.

In still a further aspect of the invention, the flow limiter is configured as a cartridge.

In still another aspect of the invention, the aforedescribed flow limiter is in combination with a control valve adapted to control the flow of hydraulic fluid from a pump, wherein the directional control valve includes a valve body with a load sense port, an inlet port, a return port, a load sense passage, and a tank passage.

Additionally, the present invention is directed to a flow limiter cartridge wherein the cartridge includes a body in the form of a barrel having threaded bores at both ends and at least one lateral opening intermediate the ends. The first plug is threaded into the first end, the first plug being adapted for connection to a load sense line of a pump. A second plug is disposed at the second end and is adapted for communication with a tank passage of a control valve. A piston is disposed between the plugs and is urged against the first plug, the piston having a passage normally aligned with the lateral opening in the body, which lateral opening is adapted to communicate with a load sense passage of a control valve. A pressure controlling orifice is disposed in the piston and communicates through the second plug which is adapted in turn to connect to a tank passage of a control valve when the load sense pressure exceeds a predetermined pressure.

The present invention also relates to the combination of the aforedescribed flow limiter and a directional control valve adapted to control flow of hydraulic fluid from a pump wherein the directional control valve includes a valve body with a load sense port, an inlet port, a return port, a load sense passage and a tank passage connected to return hydraulic fluid to tank.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 3:
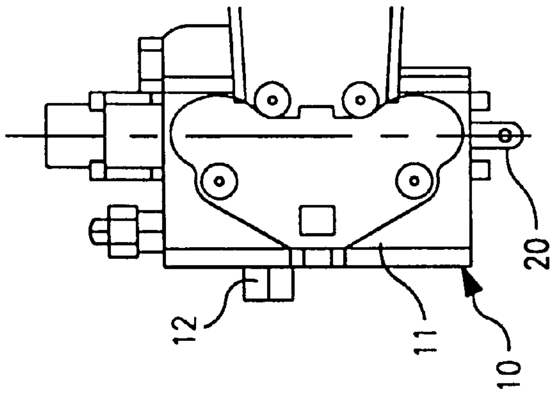
FIG. 3 is a planar view of a second side of the control valve of FIGS. 1–2.
Figure 1:
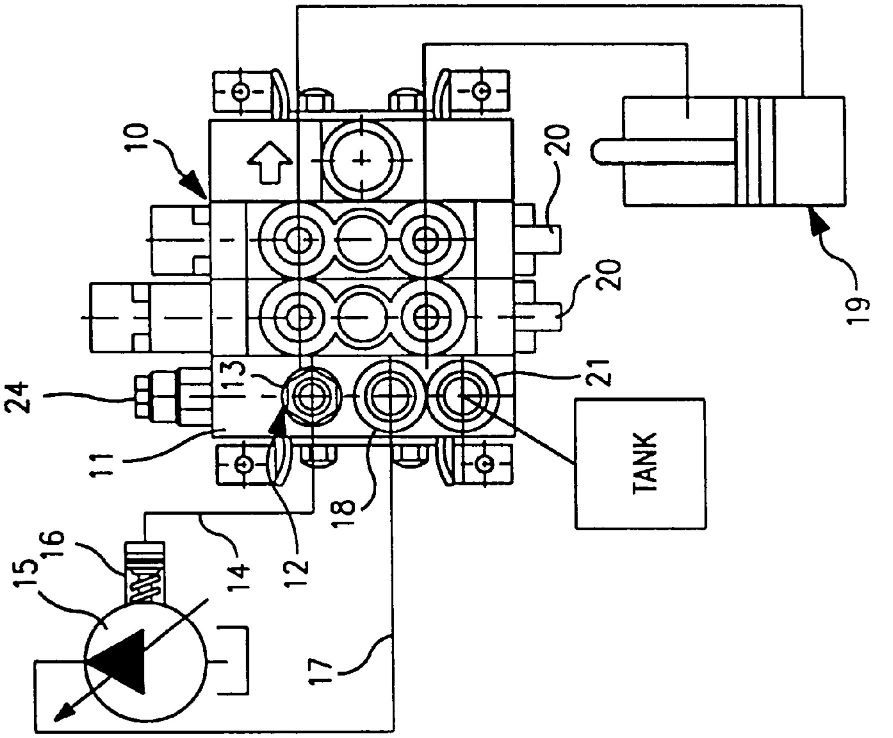
FIG. 1 is a planar top view of a directional control valve in which the present invention is employed.
Figure 2:
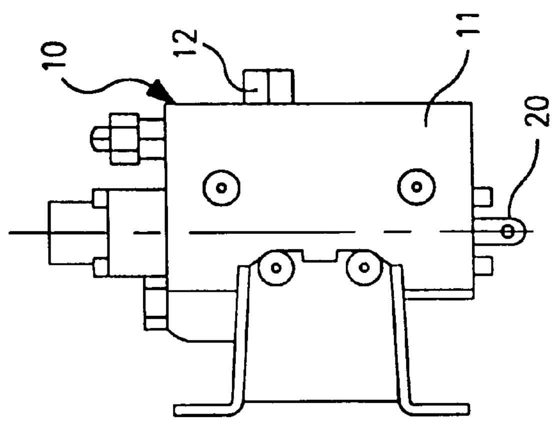
FIG. 2 is a planar view of a first side of the control valve of FIG. 1.

Referring now to FIGS. 1–3, there is shown a directional control valve 10 having a cover assembly 11 with a bleed-down cartridge 12, configured in accordance with the present invention, which control valve has a port 13 which is connected via a load sense line 14 to a pressure compensated, load sense pump 15 which has a pressure compensator 16 integral therewith. The output of the pump 15 is applied over a line 17 back through a port 18 in the directional control valve 10 to drive a hydraulic device, such as a piston in a hydraulic cylinder 19. Alternatively, the pump 15 is a fixed displacement pump with an unloader. In the arrangement of FIGS. 1–3, there are first and second cable actuators 20 for the directional control valve 10.

Figure 4:
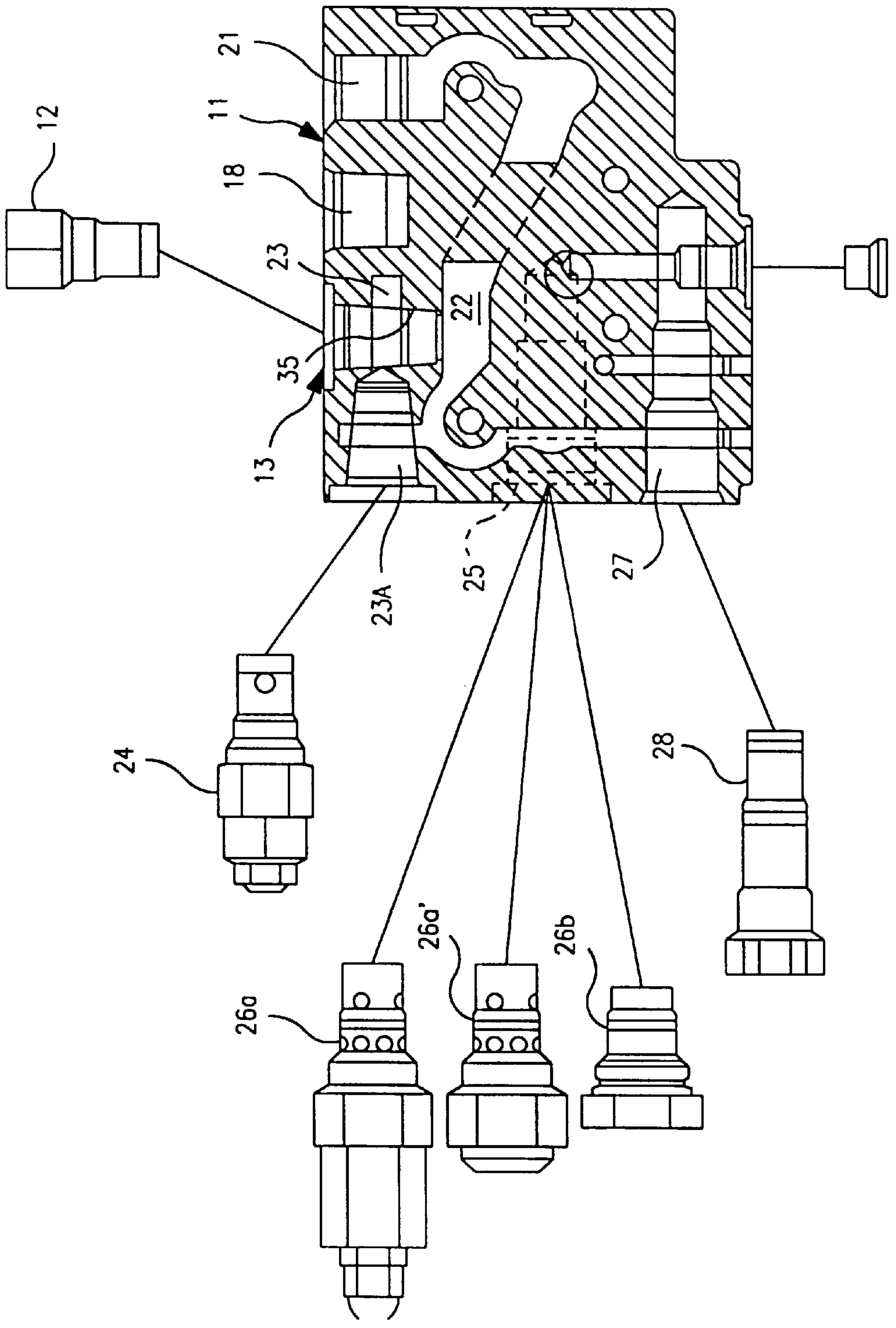
FIG. 4 is an enlarged side elevation of a valve cover assembly used with the valve of FIGS. 1–3 with plugs and cartridge inserts shown removed.

Referring now to FIG. 4, where the structure of the cover assembly 11 in which the cartridge 12 of the present invention is utilized, it is seen that the cover assembly includes the generally cylindrical opening 13 which receives the cartridge 12 and is in communication with return passage 22 that is a passageway connected to a return port 21 connected to "tank". It is also in registration with the load sense passage 23 which has a bore 23A which receives a load sense relief valve 24. The cover 11 also has port 25 that receives relief valve 26*a* or a plug 26*b* and a port 27 that receives a plug 28.

Figure 5:
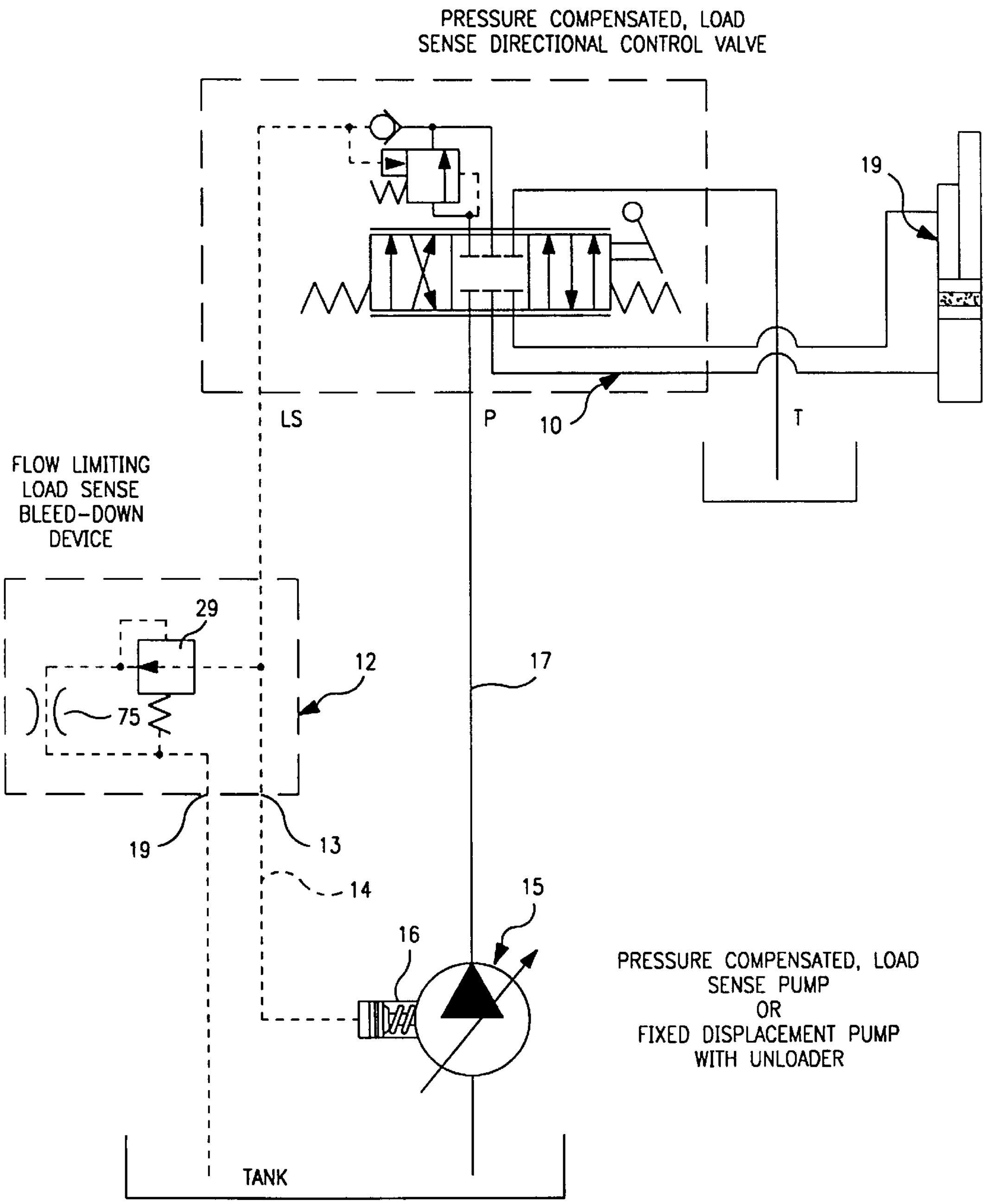
FIG. 5 is a schematic illustration of a load sense flow limiter in accordance with the present invention in combination with the directional control valve of FIG. 1, pump and hydraulic cylinder.
Figure 6:
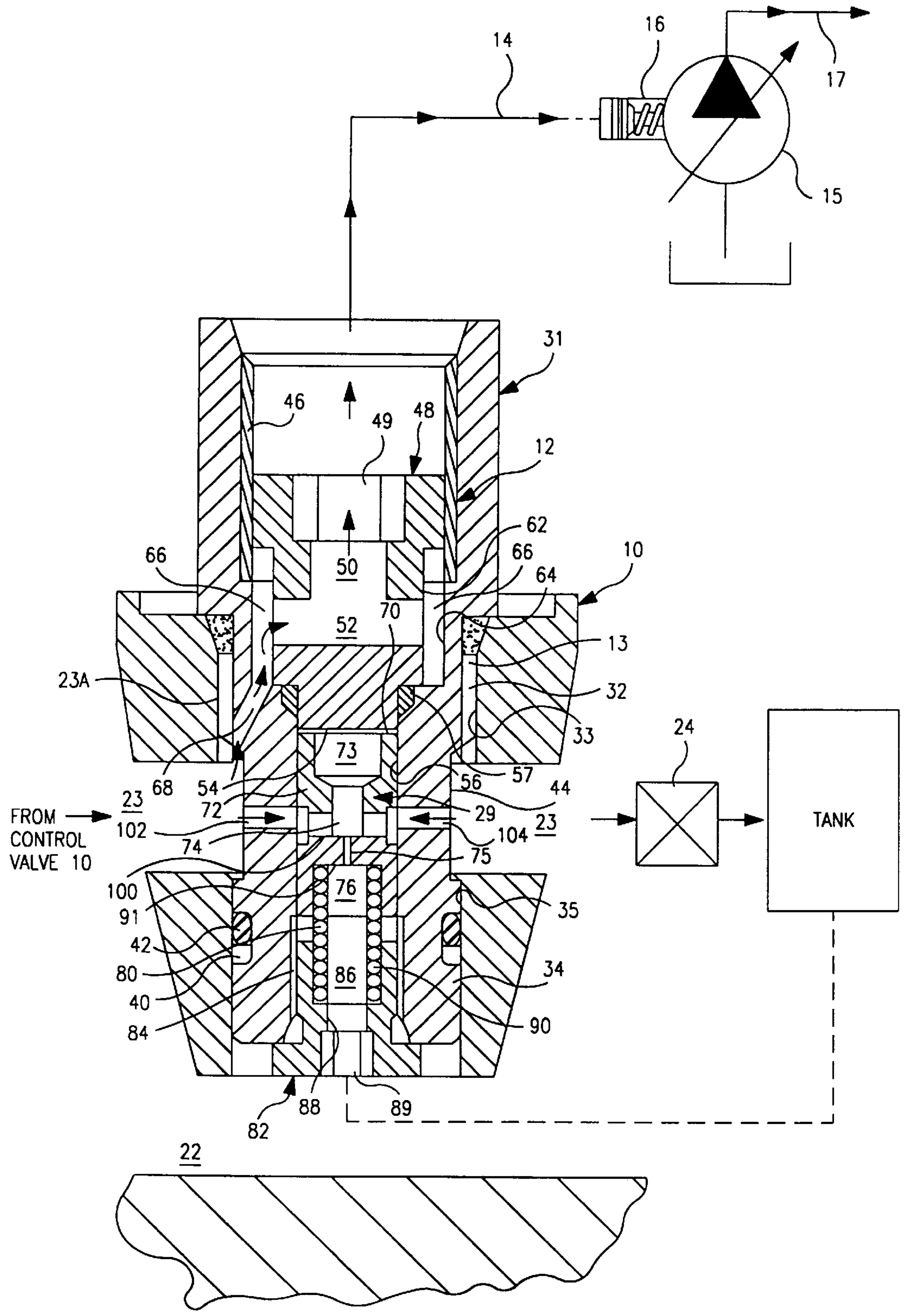
FIG. 6 is an enlarged side elevation of the cartridge embodying the hydraulic system of FIG. 5 showing the flow limiter open in a bleed-off mode and the central valve in neutral.
Figure 7:
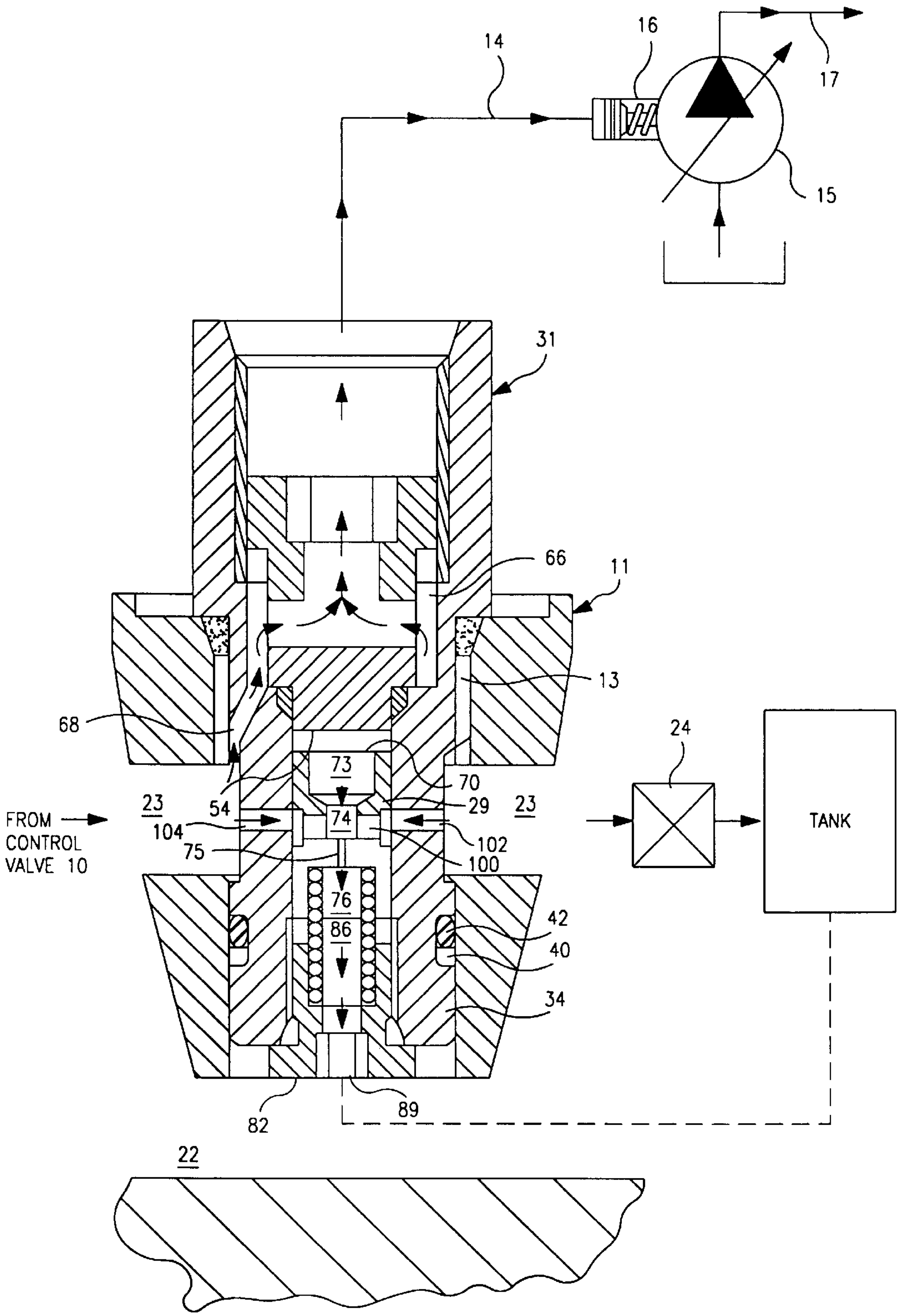
FIG. 7 is an enlarged side elevation, similar to FIG. 6, but showing the flow limiter in a pressure control mode wherein a piston is floating between a completely open and completely closed position with respect to a load sense passage within the directional control valve.

Referring now to FIGS. 5–7 which disclose the structure and operation of the load sense cartridge 12, it is seen that the load sense cartridge comprises an axially slidable valve element 29 within a valve body 31 in the form of a barrel having external threads 32 for threading in the threaded portion 33 of the bore 23A and an unthreaded end portion 34 which is received within a smooth bore portion 35 aligned with the threaded bore 23A (see FIG. 4). The unthreaded end portion 34 has a groove 40 therein which receives an O-ring 42 so as to seal with the smooth bore 35. Between the unthreaded end 34 and threaded portion 33 of the barrel formed by the valve body 31, there is a reduced diameter portion 44 which is communication with the load sense passage 23. Threaded within a threaded bore 46 of the body 31 is a first plug 48. The first plug 48 has a hexagonal opening 49 therein for turning the plug to thread into the threaded bore 46, which hexagonal opening communicates the cartridge 12 with the pressure compensator 16 of pump 15 via line 14. The hexagonal opening 49 through the plug 48 communicates with an axial bore 50 that is in turn in communication with a radial bore 52. The plug has an end face 54 which projects into a smooth bore 56 in the body 31. A seal 57 seals the end face 54 from fluid communication with the rest of the plug 48.

The plug 48 has a first narrow portion 62 which is spaced from an interior surface 64 inboard of the threaded bore 46 that defines an annular space 66 that communicates with a bore 68 which communicates with the passageway 23 so that when the cartridge is in the non-bleed off mode of FIG. 6, hydraulic fluid passes into the passageway 23, through the bore 68 and plug 48, over the line 14 and to the pressure compensator 16 of the pump 15. As is seen in FIG. 6, the end face 54 of the plug 48 abuts the end face 70 of a piston 72. The piston 72 has an axially extending first passage therein comprised of the first wide portion 73, a narrowed portion 74, and a narrower still pressure controlling orifice 75, which forms a flow limiter that opens into the bottom of an inverted cup 76. The piston 72 has a second annular end face 78 which in FIG. 6 faces and in FIG. 7 abuts an end 80 of a second plug 82 that is threaded into a threaded bore 84 of the barrel formed by the body 31. The second plug 82 has a cup portion 86 and a smooth bore 88 that communicates through a hexagonal port 89 to the exhaust return passage 22 that leads to "tank". Seated within the cup 86 is a coil spring 90 having a first end 91 that is received within the cup 76 of the piston 72 to normally bias the face 70 of the piston against the end face 54 of the first plug 48 with a selected force.

As is seen in FIG. 7, when high fluid pressure is applied from the load sense passage 23 into the radial bores 102 and 104, it passes via axial bore 74 and 73 in the piston 72 to the space between the faces 70 and 54, so as to urge the piston 72 away from the end face 54 of the plug against the bias of the coil spring 90. This causes a radially extending second passage in the form of a radial bore 100 in the piston 72 to move out of alignment with lateral opening defined by radial bores 102 and 104 through the reduced diameter portion 44 of the body 31. As is seen in FIG. 6, the radial bores 102 and 104 communicate with the load sense passage 23 which normally allows relief via the load sense relief valve 24 (also see FIG. 4). At elevated load sense pressures, hydraulic fluid within the piston 72 tends to force the passage 100 closed, but as the fluid drains through orifice 75, the spring 90 reopens communication with the radial bores 102 and 104 wherein the high pressure again compresses the spring and closes fluid passage through the bores 102 and 104. When the load sense pressure is elevated, the piston 72 reopens by oscillating between open and closed positions. As a result, load sense bleed-down flow is limited to the return passage 22 by the relatively small diameter passage 75 at elevated load sense pressures, so that at high loads more pressurized hydraulic fluid is available when needed for the system controlled by valve 10.

Figure 8:
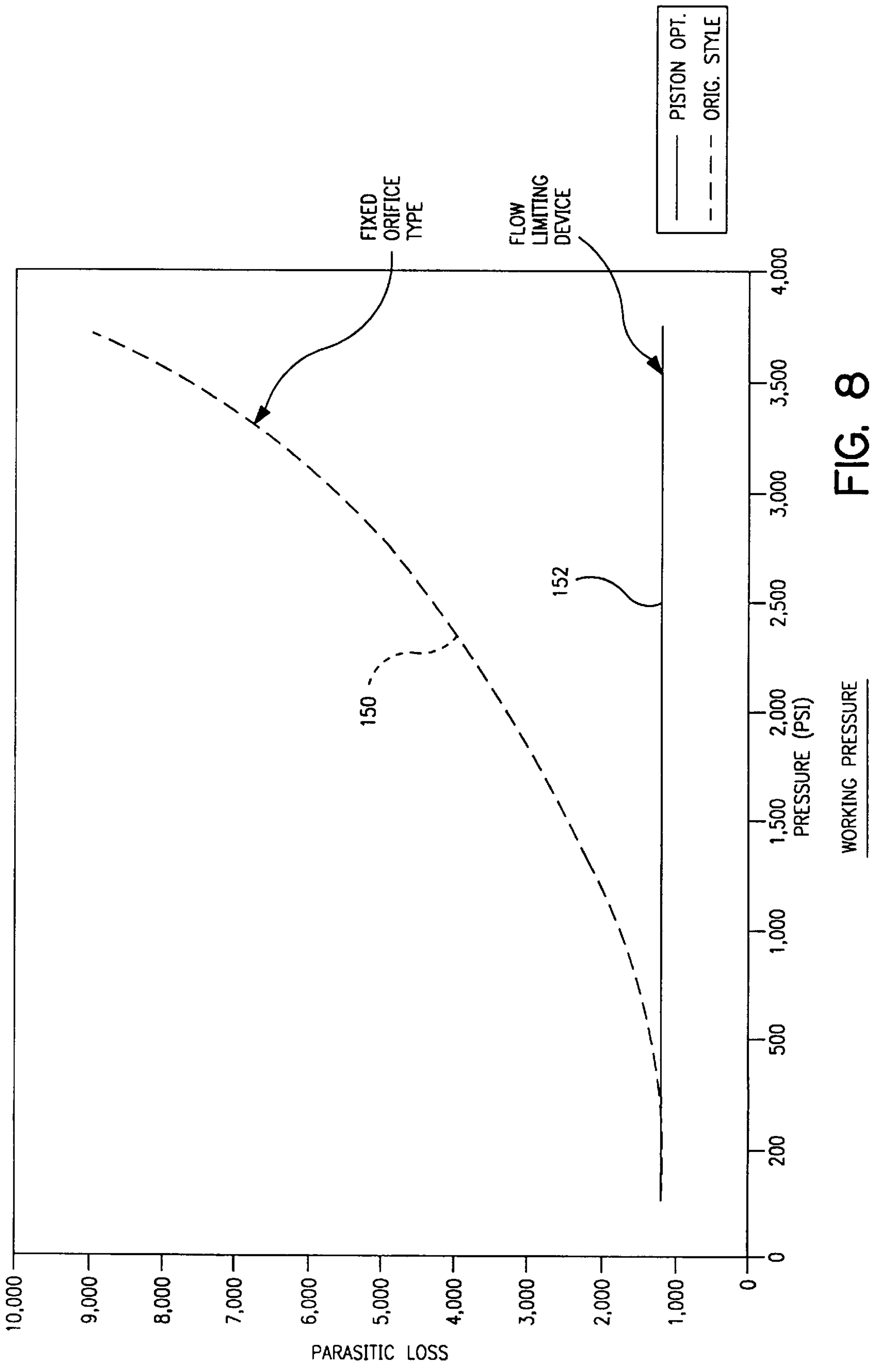
FIG. 8 is a graph plotting parasitic loss as a function of working pressure for a prior art fixed orifice valve and for a flow limiting device in accordance with the present invention.

As is seen in FIG. 8, there is a considerable increase in parasitic loss as working pressure increases when utilizing a fixed orifice prior art arrangement as seen by dotted line 150. When using the bleed-down cartridge 12 of the present invention, the flow limiting device provided by the orifice 75 maintains the parasitic loss at a steady, substantially constant, low level illustrated by solid line 152 instead of the increasing level illustrated by the dotted line 150. Accordingly, when the control valve 10 is in a neutral position, the load sensing pressure is removed so that during control valve operation, parasitic loss of flow from the available flow produced by the pump 15 is limited.

The specific size of the pressure controlling orifice 75 can be varied to accommodate the specific system in which it is used. For example, the diameter of the orifice 75 can be increased so as to make it less contamination sensitive and therefore less likely to clog.

From the foregoing description, one skilled in the art can easily ascertain the essential characteristics of this invention, and without departing from the spirit and scope thereof, can make various changes and modification of the invention to adapt it to various usages and conditions.

I claim:

1. A flow limiter cartridge useful in a directional control valve adapted to control flow of hydraulic fluid from a load sense passage to a compensator on a fluid pump as well as to tank through either a direct return passage or a load sense relief valve, the flow limiter cartridge comprising:

a cylindrical valve body with a radially opening load sense port, an axially extending inlet port connected to an axially opening outlet port adapted to connect to the compensator on the fluid pump, and an axially disposed return port for returning hydraulic fluid to tank;

a valve within the cylindrical valve body for connecting the load sense passage to the compensator on the pump and connected to the direct return passage, the valve including a pressure controlling orifice communicating with the direct return passage via the axially disposed return port;

a pressure responsive bias urging the valve to connect the load sense passage to the return passage with a selected force; and the valve having a reaction surface for overcoming the bias upon the pressure from the load sense passage exceeding the selected force of the pressure responsive bias to thereby close communication between the load sense passage and return passage, whereby the fluid in the load sense passage is throttled through the pressure controlling orifice to the return.

2. The flow limiter of claim 1, wherein the valve includes an element associated with the reaction surface moveable between a first position in which the element connects the load sense passage to the return line and a second position in which the element interferes with communication between the load sense passage and the return.

3. The flow limiter of claim 2, wherein the element is a piston slidable within a barrel defined by the valve body; wherein the reaction surface is on the piston; and wherein the pressure bias is a spring urging the piston to the first position.

4. The flow limiter of claim 3, wherein the piston has an axially extending stepped bore extending completely therethrough adapted to connect the load sense passage from the valve to the return and a radial bore intersecting the axially extending bore for connecting the load sense passage to the load sense line.

5. A flow limiter cartridge for mounting in a controller having a load sense passage and a return passage, comprising:

a body in the form of a barrel having threaded bores at both ends and at least one lateral opening intermediate the ends;

a first plug threaded into the first end adapted for connection to the load sense line which is connected to a compensator of a pump through an axially opening outlet in the first plug;

a second plug at a second end adapted for communication with the return passage of the control valve;

a piston disposed between the plugs and being urged against the first plug the piston having a passage normally aligned with the lateral opening in the body, which lateral opening is adapted to communicate with the load sense passage of the control valve; and a pressure controlling orifice in the piston communicating through the second plug, which pressure controlling orifice is adapted to in turn connect to the return to tank passage of the control valve when the load sense pressure exceeds a predetermined pressure.

6. The flow limiter cartridge of claim 5, wherein the piston is biased to the first position by a spring exerting a predetermined force disposed between the piston and the second plug.

7. The flow limiter cartridge of claim 6, wherein the pressure controlling orifice is formed in an axially extending passage through the piston which is intersected by the passage that is normally aligned with the lateral opening in the body.

8. In combination:

a directional control valve adapted to control the flow of hydraulic fluid from a pump, wherein the directional control valve include a valve body with a load sense port, an inlet port, a return port, a load sense passage and a return passage to tank connected to the return port, the flow limiter comprising:

a cylindrical body defining a barrel extending in an axial direction adapted for communication with the load sense passage and the tank passage, the cylindrical body having a coupling for connection to a load sense line to the pump and a return port communicating with the return passage to tank;

a valve within the cylindrical body for connecting the load sense passage through a load sense relief valve to tank and to the return passage to tank, the valve including a pressure controlling orifice therein communicating with the return port;

a pressure responsive bias urging with a selected force the valve in the axial direction to fully open the load sense passage; and the valve having a reaction surface for overcoming the bias upon the pressure from the load sense passage exceeding the selected force of the bias to thereby close communication between the load sense passage and return passage, whereby the fluid in the load sense passage is throttled through the pressure controlling orifice to the return.

9. The combination of claim 8, wherein the valve includes an element associated with the reaction surface moveable between a first position in which the element connects the load sense passage to the return line and a second position in which the element interferes with communication between the load sense passage and the return.

10. The combination of claim 9, wherein the element is a piston slidable within the barrel; wherein the reaction surface is on the piston; and wherein the bias is a spring urging the piston to the first position.

11. The combination of claim 9, wherein the piston has an axially extending stepped bore extending completely therethrough adapted to connect the load sense passage from the valve to the return and a radial bore intersecting the axially extending bore for connecting the load sense passage to the load sense line.

* * * * *